United States Patent
Moon et al.

(10) Patent No.: US 12,185,871 B2
(45) Date of Patent: Jan. 7, 2025

(54) APPARATUS FOR ESTIMATING TEMPERATURE OF FOOD

(71) Applicant: LG Electronics Inc., Seoul (KR)

(72) Inventors: Hyunwook Moon, Seoul (KR);
Byungkyu Park, Seoul (KR);
Yangkyeong Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 584 days.

(21) Appl. No.: 17/437,214

(22) PCT Filed: Feb. 7, 2020

(86) PCT No.: PCT/KR2020/001790
§ 371 (c)(1),
(2) Date: Sep. 8, 2021

(87) PCT Pub. No.: WO2020/184845
PCT Pub. Date: Sep. 17, 2020

(65) Prior Publication Data
US 2022/0167787 A1 Jun. 2, 2022

(30) Foreign Application Priority Data

Mar. 8, 2019 (KR) .................. 10-2019-0027197

(51) Int. Cl.
*A47J 36/32* (2006.01)
*G01K 1/02* (2021.01)
(Continued)

(52) U.S. Cl.
CPC ............ *A47J 36/321* (2018.08); *G01K 1/026* (2013.01); *G01K 3/06* (2013.01); *A47J 2202/00* (2013.01); *G01K 7/36* (2013.01)

(58) Field of Classification Search
CPC ...... A47J 36/321; A47J 2202/00; A47J 36/00; A47J 27/00; G01K 1/026; G01K 3/06;
(Continued)

(56) References Cited

U.S. PATENT DOCUMENTS 6,414,284 B1   7/2002   Arroubi
8,581,159 B2   11/2013  Ernst et al.
(Continued)

FOREIGN PATENT DOCUMENTS

DE   102011086912 A1 * 5/2012 ............ A47J 36/321
DE   212014000249 U1 * 10/2016 ............... A23L 5/10
(Continued)

OTHER PUBLICATIONS

Office Action in Korean Appln. No. 10-2019-0027197, mailed on Jun. 20, 2024, 19 pages (with English translation).

*Primary Examiner* — Brandi N Hopkins
*Assistant Examiner* — Janice M Soto
(74) *Attorney, Agent, or Firm* — Fish & Richardson P.C.

(57) ABSTRACT

The apparatus comprises a case, a magnetic member which is provided at a bottom surface of the case and attaches the case to the outer surface of the cooking vessel by forming an attractive force with respect to the outer surface of the cooking vessel, first and second temperature sensors which are disposed at the bottom surface of the case while being spaced a predetermined distance apart from each other in the vertical direction, and measure temperatures of two measurement points located at the outer surface of the cooking vessel and spaced the predetermined distance apart from each other in the vertical direction, respectively and a controller which is provided in the case and estimates the temperature of the food based on an average value of the
(Continued)

temperatures measured respectively by the first and second temperature sensors and a desired temperature value provided by a user.

16 Claims, 9 Drawing Sheets

(51) Int. Cl.
    *G01K 3/06*     (2006.01)
    *G01K 7/36*     (2006.01)

(58) Field of Classification Search
    CPC ...... G01K 7/36; G01K 1/146; G01K 2207/06; G01K 2207/02
    USPC ......................................................... 374/208
    See application file for complete search history.

(56) References Cited

U.S. PATENT DOCUMENTS

| | | |
|---|---|---|
| 2001/0032546 A1 | 10/2001 | Sharpe |
| 2002/0003832 A1 | 1/2002 | Siefert |
| 2004/0149736 A1 * | 8/2004 | Clothier ................. H05B 6/062 219/627 |
| 2011/0180438 A1 | 7/2011 | Radi |
| 2015/0208845 A1 | 7/2015 | Robbins et al. |
| 2017/0280510 A1 | 9/2017 | Kim et al. |
| 2020/0194929 A1 * | 6/2020 | Li ......................... H01R 13/504 |

FOREIGN PATENT DOCUMENTS

| | | | | |
|---|---|---|---|---|
| EP | 3104270 A1 | * | 12/2016 | ........... G06F 3/0346 |
| JP | 10002806 A | * | 1/1998 | |
| JP | 2002231433 A | * | 8/2002 | |
| JP | 3374640 B2 | | 2/2003 | |
| JP | 2005108745 | | 4/2005 | |
| JP | 2008034228 | | 2/2008 | |
| JP | 2014-016223 A | | 1/2014 | |
| JP | 2014216246 | | 11/2014 | |
| KR | 1020050120988 | | 12/2005 | |
| KR | 10-1568562 B1 | | 11/2015 | |
| KR | 20160018370 A | * | 2/2016 | |
| KR | 1020160018370 | | 2/2016 | |
| KR | 1020170111364 | | 10/2017 | |
| WO | WO-2018148363 A1 | * | 8/2018 | ......... A23C 19/0912 |

* cited by examiner

APPARATUS FOR ESTIMATING TEMPERATURE OF FOOD

CROSS-REFERENCE TO RELATED APPLICATIONS

This application is a National Stage application under 35 U.S.C. § 371 of International Application No. PCT/KR2020/001790, filed on Feb. 7, 2020, which claims the benefit of Korean Patent Application No. 10-2019-0027197, filed on Mar. 8, 2019. The disclosures of the prior applications are incorporated by reference in their entirety.

BACKGROUND

Technical Field

The present disclosure relates to a apparatus for estimating a temperature of food contained in a cooking vessel by using the temperatures of two measurement points located at the outer surface of the cooking vessel and spaced a predetermined distance apart from each other a vertical direction.

Background Art

Induction heating apparatuss are replacing gas stoves that have been popularly used in homes and restaurants.

Unlike gas stoves, induction heating apparatuss do not use a flame generated by gas as a heat source, but use an induced current generated by a magnetic field as a heat source. As a result, they are free from harmful gas, are safe from fire, and have a small risk of burns, so their market size is increasing explosively.

However, users who are accustomed to using a conventional gas stove are not accustomed to the heating performance of the induction heating apparatuss, and thus cannot accurately control the temperature of food being cooked. Accordingly, there is a trial and error in which the food becomes undercooked or the food is overheated.

In order to prevent such trial and error, it is necessary to measure the current temperature of food being cooked, and for this purpose, various methods for measuring the temperature of food being cooked have been proposed.

Representatively, in the related art, a method of measuring the surface temperature of a cooking vessel containing food and estimating the temperature of the food through the measurement value (hereinafter referred to as an indirect measurement method), and a method of directly inserting a temperature measuring probe into the food to measure the temperature of the food (hereinafter referred to as a direct measurement method) are used.

However, according to the conventional indirect measurement method, there is a limitation in that the type of cooking vessel is limited or the measurement location is limited in order to consistently apply the temperature estimation method. In addition, according to the conventional direct measurement method, there is a problem that the food may be contaminated when the probe is in direct contact with the food, and there is a limitation in that a lid must be opened in order to measure the temperature of the food.

DETAILED DESCRIPTION OF INVENTION

Technical Problem

An object of the present disclosure is to estimate a temperature of food contained in a cooking vessel by using the temperatures of two arbitrary measurement points located at the outer surface of the cooking vessel and spaced a predetermined distance apart from each other in a vertical direction.

Another object of the present disclosure is to estimate a temperature of food being cooked in consideration of a fundamental difference between an actual temperature of the food and a measurement value.

Another object of the present disclosure is to estimate a temperature of food being cooked by correcting a difference between a measurement value and a user's desired temperature of the food.

The objects of the present disclosure are not limited to the objects mentioned above, and other objects and advantages of the present disclosure not mentioned may be understood by the following description, and will be more clearly understood by the examples of the present disclosure. It will also be readily apparent that the objects and advantages of the present disclosure may be realized by the means and combinations thereof indicated in the claims.

Technical Solution

According to an embodiment of the present disclosure, the apparatus which is attached to an outer surface of a cooking vessel containing food in a vertical direction and estimates a temperature of the food, includes a case, a magnetic member which is provided at a bottom surface of the case and attaches the case to the outer surface of the cooking vessel by forming an attractive force with respect to the outer surface of the cooking vessel, first and second temperature sensors which are disposed at the bottom surface of the case while being spaced a predetermined distance apart from each other in the vertical direction, and measure temperatures of two measurement points located at the outer surface of the cooking vessel and spaced the predetermined distance apart from each other in the vertical direction, respectively, and a controller which is provided in the case and estimates the temperature of the food based on an average value of the temperatures measured respectively by the first and second temperature sensors and a desired temperature value provided by a user.

Advantageous Effect

According to the embodiments of the present disclosure, a temperature difference according to the height of the measurement point caused by a difference in thermal conductivity for each cooking vessel is compensated by estimating the temperature of food contained in the cooking vessel using the temperatures of two arbitrary measurement points located at the outer surface of the cooking vessel and spaced a predetermined distance apart from each other in a vertical direction. Accordingly, an operation for estimating the temperature of food contained in an arbitrary cooking vessel may be performed.

According to the embodiments of the present disclosure, by estimating the temperature of the food in consideration of the fundamental difference between the actual temperature of the food and the measured value and the difference between the temperature and the measured value of the food desired by the user, the accuracy of temperature estimation is improved.

EMBODIMENT OF INVENTION

Figure 1:
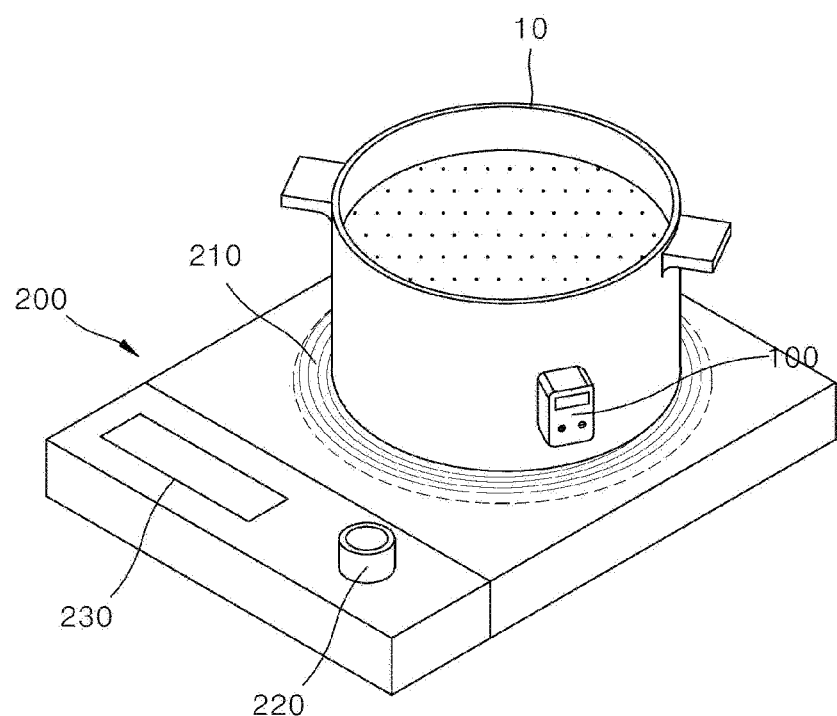
FIG. 1 is a view showing a state in which a apparatus for estimating a temperature of food being cooked according to an embodiment of the present disclosure is attached to the outer surface of a cooking vessel heated on an induction heating apparatus.

The above-described objects, features and advantages will be described below in detail with reference to the accompanying drawings, and accordingly, those skilled in the art to which the present disclosure pertains will be able to easily implement the technical idea of the present disclosure. In describing the present disclosure, if it is determined that a detailed description of a known technology related to the present disclosure may unnecessarily obscure the gist of the present disclosure, the detailed description will be omitted. Hereinafter, preferred embodiments according to the present disclosure will be described in detail with reference to the accompanying drawings. In the drawings, the same reference numerals are used to refer to the same or similar components.

In the following, that an arbitrary component is disposed on the "upper (or lower)" of a component or "on (or under)" of a component means that any component is disposed in contact with the upper surface (or lower surface) of the component. Furthermore, it may mean that other components may be interposed between the component and any component disposed on (or under) the component.

In addition, when it is described that a component is "connected", "coupled" or "contacted" to another component, it is to be understood that the components may be directly connected or contacted to each other, but other components are "interposed" between each component or, each component may be "connected", "coupled" or "contacted" through another component.

Hereinafter, a apparatus for estimating a temperature of food being cooked according to an embodiment of the present disclosure will be described in detail with reference to FIGS. 1 to 6.

FIG. 1 is a view showing a state in which a apparatus for estimating a temperature of food being cooked according to an embodiment of the present disclosure is attached to an outer surface of a cooking vessel heated on an induction heating apparatus. Also, FIG. 2 is a perspective view of the apparatus for estimating a temperature of food being cooked shown in FIG. 1.

Figure 2:
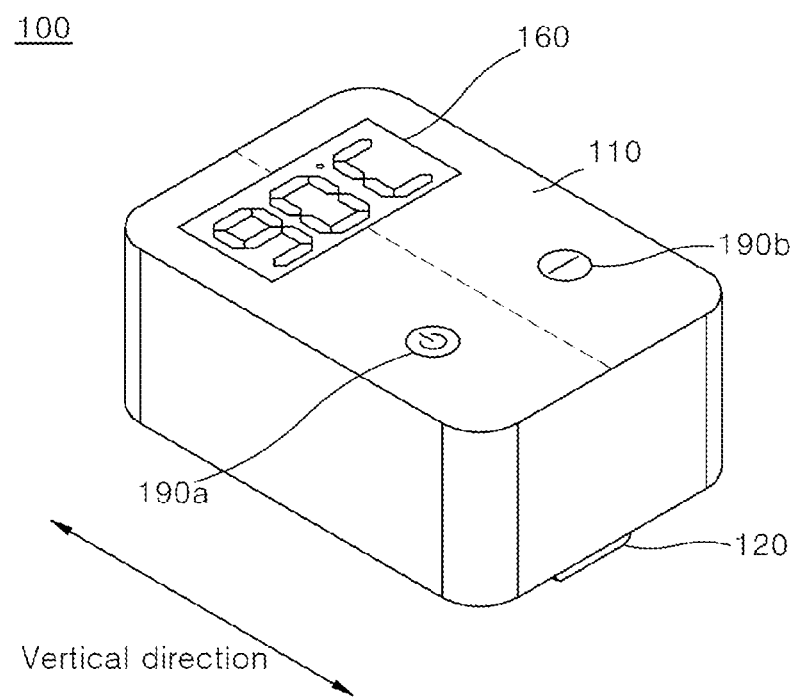
FIG. 2 is a perspective view of the apparatus for estimating a temperature of food being cooked shown in FIG. 1.
Figure 3A:
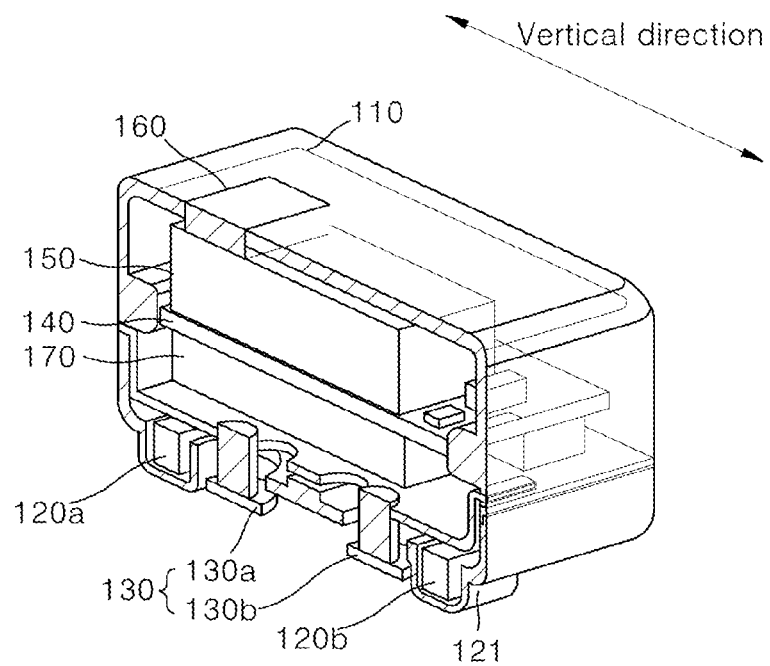
FIGS. 3a to 3c are views for explaining an example of the apparatus for estimating a temperature of food being cooked shown in FIG. 2.
Figure 3B:
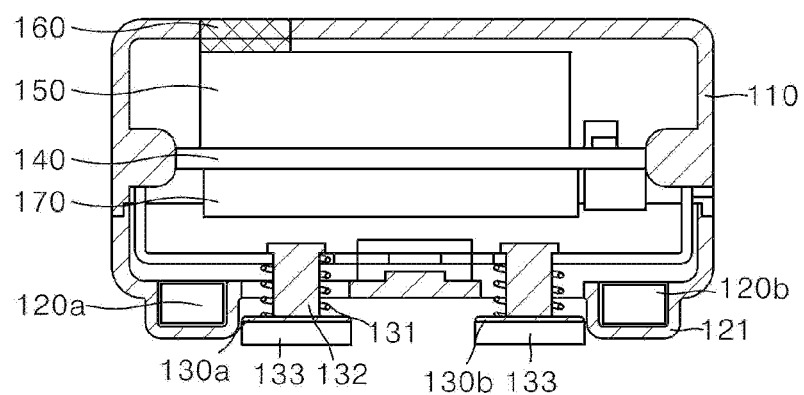
Figure 3C:
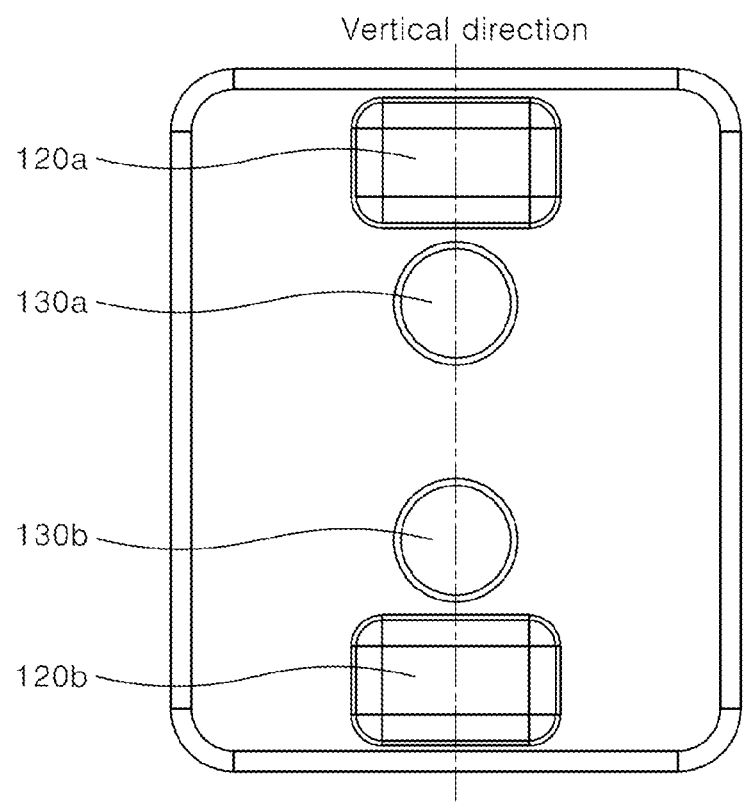
Figure 4:
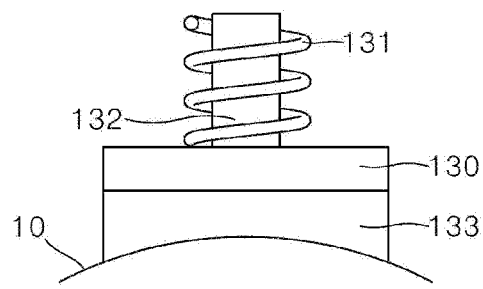
FIG. 4 is a view for explaining a method for measuring a temperature of an outer surface of a cooking vessel with the temperature sensor shown in FIGS. 3a to 3c.

FIGS. 3a to 3c are views for explaining an example of the apparatus for estimating a temperature of food being cooked shown in FIG. 2, and FIG. 4 is a view for explaining a method for measuring a temperature of an outer surface of a cooking vessel with the temperature sensor shown in FIGS. 3a to 3c.

Figure 5A:
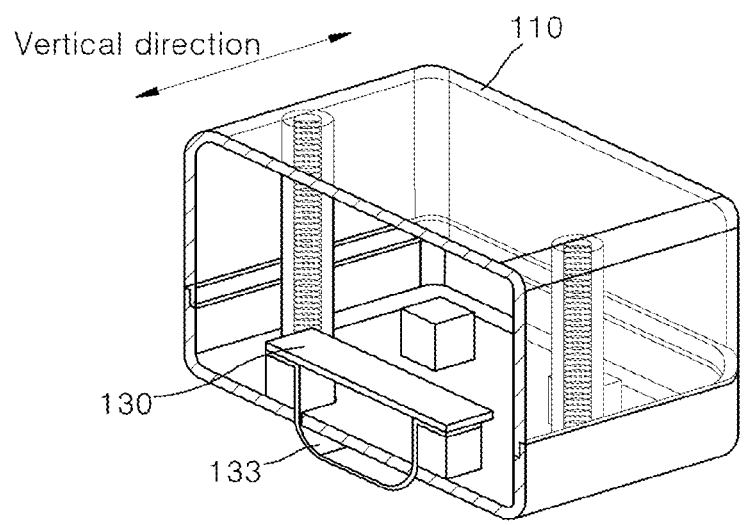
FIGS. 5a and 5b are views for explaining another example of the apparatus for estimating a temperature of food being cooked shown in FIG. 2.
Figure 5B:
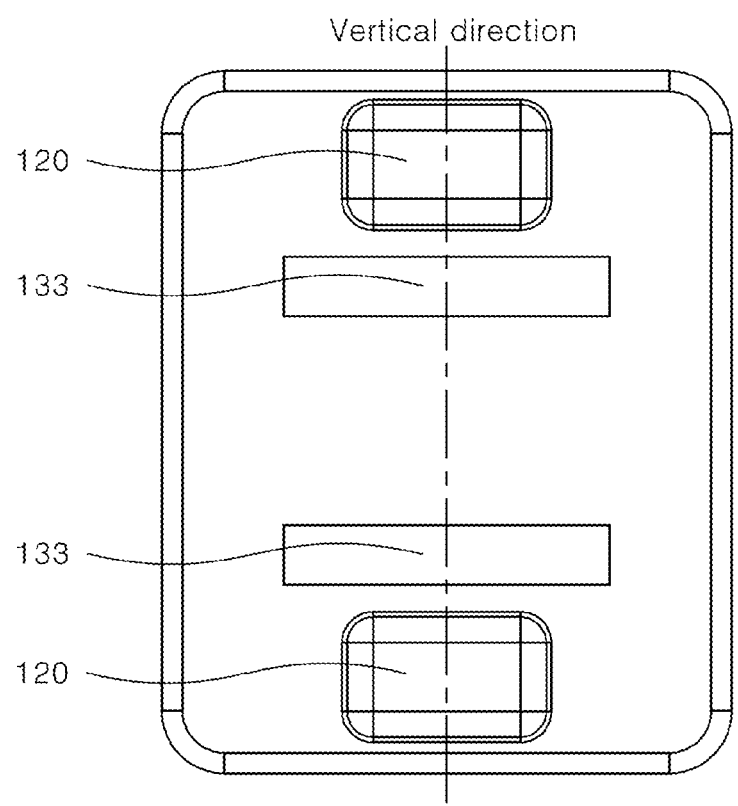
Figure 6:
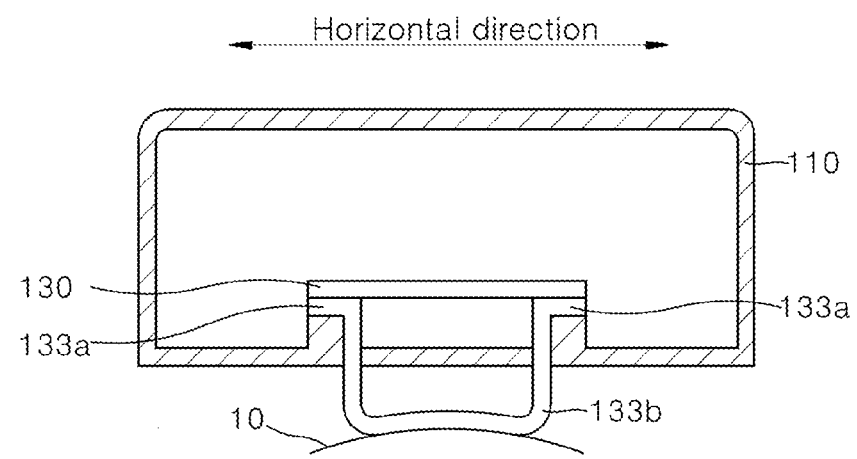
FIG. 6 is a view for explaining a method for measuring a temperature of an outer surface of a cooking vessel with the temperature sensor shown in FIGS. 5a and 5b.

FIGS. 5a and 5b are views for explaining another example of the apparatus for estimating a temperature of food being cooked shown in FIG. 2, and FIG. 6 is view for explaining a method for measuring a temperature of an outer surface of a cooking vessel with the temperature sensor shown in FIGS. 5a and 5b.

Referring to FIG. 1, a apparatus 100 for estimating a temperature of food being cooked according to an embodiment of the present disclosure may be vertically attached to the outer surface of a cooking vessel 10 heated on an arbitrary heating source.

The heating source may be any heating apparatus that applies heat to the surface of the cooking vessel 10 containing food to heat the food. For example, the heating source may be a gas range using a flame as a heat source, or may be an induction heating apparatus 200 using an induced current generated by a magnetic field as a heat source.

However, in the following description, it is assumed that the heating source of the present disclosure is the induction heating apparatus 200 that is free from harmful gases, is safe from fire, and has a relatively small risk of burns.

As shown in FIG. 1, the induction heating apparatus 200 may include a heating coil 210, a knob switch 220, a display unit 230, and a control PCB (not shown). In addition, the induction heating apparatus 200 may further include a communication unit (not shown) for performing data communication with the apparatus 100 for estimating a temperature of food being cooked to be described later.

The control PCB of the induction heating apparatus 200 may supply a current to the heating coil 210. When the current is supplied to the heating coil 210, a magnetic field may be generated in the heating coil 210. The magnetic field generated by the heating coil 210 may induce the current in the cooking vessel 10, and Joule's heat may be generated in the cooking vessel 10 due to the induced current.

For the generation of induced current, the cooking vessel 10 to which the present disclosure is applied may be configured to include any magnetic component. For example, the cooking vessel 10 may be made of cast iron containing an iron (Fe) component, or a clad in which iron (Fe), aluminum (Al), stainless steel and the like are joined.

On the other hand, the knob switch 220 is provided on the upper surface of the induction heating apparatus 200, and can provide the control PCB with a signal according to the degree of rotation. The control PCB may determine the output of the heating coil 210 according to the signal provided from the knob switch 220. In other words, the amount of current supplied to the heating coil 210 may be controlled according to the degree of rotation of the knob switch 220.

Like the knob switch 220, the display unit 230 may be provided on the upper surface of the induction heating apparatus 200. The control PCB may control the display unit 230 to visually output the state information of the induction heating apparatus 200.

In the above, the induction heating apparatus 200 for heating the cooking vessel 10 has been described with reference to FIG. 1, but the induction heating apparatus 200 may have various structures used in a corresponding art, and is not limited to the configuration shown in FIG. 1.

The apparatus 100 for estimating a temperature of food being cooked according to an embodiment of the present disclosure may measure the temperature of food contained in the cooking vessel 10 by using the temperatures of two arbitrary measurement points located at the outer surface of the cooking vessel 10 and spaced a predetermined distance apart from each other in the vertical direction.

To this end, the apparatus 100 for estimating a temperature of food being may include a case 110, a magnetic member 120, first and second temperature sensors 130a and 130b, and a controller 140. Hereinafter, each component constituting the apparatus 100 for estimating a temperature of food being cooked will be described in detail with reference to the drawings.

Referring to FIG. 2, the outside of the apparatus 100 for estimating a temperature of food being cooked may be configured as the case 110. A display module 160 to be described later may be exposed on the outer surface of the case 110, and a power button 190a and a function button 190b may be additionally provided. The functions of the display module 160 and each button will be described later.

The magnetic member 120 is provided on the bottom surface of the case 110, and forms an attractive force with respect to the outer surface of the cooking vessel 10 to attach the case 110 to the outer surface of the cooking vessel 10.

As described above, the cooking vessel 10 to which the present disclosure is applied may be configured to include any magnetic component. Accordingly, the magnetic member 120 provided on the bottom surface of the case 110 may form an attractive force with respect to the outer surface of the cooking vessel 10, and as the magnetic member 120 is attached to the outer surface of the cooking vessel 10, the case 110 may be attached to the outer surface of the cooking vessel 10.

On the other hand, the first and second temperature sensors 130a and 130b may be disposed at the bottom surface of the case 110 and spaced a predetermined distance apart from each other in the vertical direction, and may measure the temperatures of two measurement points located at the outer surface of the cooking vessel 10 and spaced a predetermined distance apart from each other in the vertical direction, respectively. The vertical and horizontal directions described below will be described on the assumption that the apparatus 100 for estimating a temperature of food being cooked is attached to the cooking vessel 10, and the vertical direction may be defined as the direction of gravity, and the horizontal direction may be defined as a direction perpendicular to the direction of gravity.

The first and second temperature sensors 130a and 130b may be described with two structural examples. First, a first structural example will be described with reference to FIGS. 3a to 3c and 4. In FIGS. 3a to 3b, the controller 140, the communication module 150, the display module 160, and the battery 170 for supplying power to each module are shown to be included in the case 110, and each module will be described later.

Referring to FIGS. 3a to 3c, the case 110 may have a rectangular parallelepiped shape. In this case, the magnetic member 120 may be provided adjacent to one edge and the other edge facing each other among edges constituting the bottom surface of the case 110, respectively.

More specifically, the magnetic member 120 may be formed of first and second magnetic members 120a and 120b spaced apart from each other in the vertical direction and protruding in the downward direction of the case 110. Since the magnetic member 120 forms an attractive force perpendicular to the outer surface of the cooking vessel 10, when the magnetic member 120 is configured as a single body, the case 110 may rotate left and right. To prevent this, in the present disclosure, the magnetic member 120 may be configured in plurality, and thus the case 110 may be fixedly attached to the outer surface of the cooking vessel 10 in the vertical direction.

On the other hand, the magnetic member 120 may protrude in the downward direction of the case 110 by being coupled to the bottom surface of the case 110 of the rectangular parallelepiped, and as shown in FIGS. 3a and 3b, may be accommodated in the case 110 and protrude downward.

More specifically, the case 110 may include a receiving space 121 protruding in the downward direction, and the first and second magnetic members 120a and 120b may be provided to protrude in the downward direction of the case 110 by being accommodated in the receiving space 121. In this case, the magnetic member 120 and the outer surface of the cooking vessel 10 may form an attractive force with each other with the receiving space therebetween.

Like the magnetic member 120, the first and second temperature sensors 130a and 130b may also be provided on the bottom surface of the case 110, and may be spaced a predetermined distance apart from each other in the vertical direction. The separation distance between the first and second temperature sensors 130a and 130b may be the same as or different from the separation distance between the first and second magnetic members 120a and 120b. However, when the first and second temperature sensors 130a and 130b and the first and second magnetic members 120a and 120b are provided on the same vertical line as shown in FIG. 3c, the separation distance of the first and second temperature sensors 130a and 130b may be different from the separation distance of the first and second magnetic members 120a and 120b.

As described above, as the magnetic member 120 is provided to protrude from the bottom surface of the case 110, the case 110 and the outer surface of the cooking vessel 10 may be spaced apart. In this case, in order to measure the temperature of the outer surface of the cooking vessel 10, the first and second temperature sensors 130a and 130b may also be provided protruding from the bottom surface of the case 110.

More specifically, the first and second temperature sensors 130a and 130b may be connected to the other end of the spring 131 having one end fixed to the bottom surface of the case 110 and protruding downward. The first and second temperature sensors 130a and 130b may be in close contact with the outer surface of the cooking vessel 10 by the elastic force of the spring 131 to measure the temperature of the two measurement points, respectively.

Referring to FIG. 3b, the spring 131 may be wound on the spring support 132 configured to rise or fall through the bottom surface of the case 110, and one end of the spring 131 may be fixed in contact with the bottom surface of the case 110. Meanwhile, the temperature sensor 130 may be connected to the other end of the spring 131 by being fixedly coupled to the bottom surface of the spring support 132. To this end, the horizontal cross-section of the temperature sensor 130 may be formed wider than the horizontal cross-section of the spring support 132.

The other end of the spring 131 may be fixed in contact with the upper surface of the temperature sensor 130 at the lower end of the spring support 132. The temperature sensor 130 may be pushed in the downward direction of the case 110 by the elastic force of the spring 131, and accordingly, when the magnetic member 120 is attached to the outer surface of the cooking vessel 10, the temperature sensor 130 may be in close contact with the outer surface of the cooking vessel 10.

More specifically, as shown in FIGS. 3a and 3b, when the temperature sensor 130 and the magnetic member 120 protrude from the bottom surface of the case 110, the height of the spring 131 at the time the spring 131 is fully extended by the elastic force may be higher than the height at which the magnetic member 120 protrudes. In addition, the maximum elastic force of the spring 131 may be weaker than the attractive force of the magnetic member 120. Accordingly, when the magnetic member 120 is attached to the outer surface of the cooking vessel 10, the temperature sensor 130 may be in close contact with the outer surface of the cooking vessel 10 by applying a predetermined pressure to the outer surface of the cooking vessel 10.

According to these structural features, the first and second temperature sensors 130*a* and 130*b* may come into contact with two measurement points located at the outer surface of the cooking vessel 10 and spaced a predetermined distance apart from each other in the vertical direction, and may measure the temperature of the contact surface. The first and second temperature sensors 130*a* and 130*b* of the present disclosure may be any contact-type temperature sensor, and may be formed of, for example, a thermistor, a thermo sensitive ferrite and the like.

On the other hand, in order to increase the contact area for the measurement point, the first and second temperature sensors 130*a* and 130*b* are made of an elastic material and may measure the temperature of each measurement point that is transmitted through the heat conductive member 133 in close contact with the outer surface of the cooking vessel 10.

More specifically, the first and second temperature sensors 130*a* and 130*b* may be connected to the heat conductive member 133, and the heat conductive member 133 may be in close contact with the outer surface of the cooking vessel 10. The heat conductive member 133 may be deformed along the outer surface of the cooking vessel 10 as it has elasticity, and may be in close contact with each measurement point with a large contact area.

The heat conductive member 133 is in close contact with each measurement point to transfer the heat generated at the measurement point to the first and second temperature sensors 130*a* and 130*b*, and the first and second temperature sensors 130*a* and 130*b* may measure the temperature of each measurement point by using the heat transferred through the heat conductive members 133.

In one example, the heat conductive member 133 may be provided on bottom surfaces of the first and second temperature sensors 130*a* and 130*b*.

Referring back to FIG. 3*b*, the heat conductive member 133 may be attached to the bottom surfaces of the first and second temperature sensors 130*a* and 130*b*. A thermal pad may be used as the heat conductive member 133 for attachment to the temperature sensor 130. As described above, when the case 110 is attached to the outer surface of the cooking vessel 10 by the magnetic member 120, the temperature sensor 130 may be pushed in the direction toward the outer surface of the cooking vessel 10 by the spring 131. have. Accordingly, the heat conductive member 133 provided on the bottom surface of each temperature sensor 130 may also be pushed in a direction toward the outer surface of the cooking vessel 10.

Referring to FIG. 4, the spring 131 wound around the spring support 132 in a state where one end of the spring 131 is fixed to the bottom surface of the case 110 may push the temperature sensor 130 and the heat conductive member 133 provided on the bottom surface thereof in the direction of the cooking vessel 10. Accordingly, the heat conductive member 133 may be in contact with the outer surface of the cooking vessel 10, and the heat conductive member 133 may be deformed along the outer surface of the cooking vessel 10 by elasticity.

As the heat conductive member 133 is deformed along the outer surface of the cooking vessel 10, the contact surface for the measurement point may be widened, and the heat transferred over a wide area may be provided to the temperature sensor 130. The temperature sensor 130 may measure the temperature of heat transferred from a wide contact surface, and accordingly, the accuracy of temperature measurement may be improved.

Next, a second structural example of the first and second temperature sensors 130*a* and 130*b* will be described with reference to FIGS. 5*a* and 5*b*. Meanwhile, in FIGS. 5*a* and 5*b*, the controller 140, the communication module 150, the display module 160, and the battery 170 shown in FIGS. 3*a* and 3*b* are omitted for convenience of explanation.

Since the basic structure of the second structural example is the same as that of the first structural example described with reference to FIGS. 3*a* to 3*c*, the difference will be mainly described below.

Referring to FIGS. 5*a* and 5*b*, the heat conductive members 133 respectively connected to the first and second temperature sensors 130*a* and 130*b* may include both ends 133*a* fixed to the bottom surface of the case 110, and a central portion 133*b* connected to the both ends 133*a* in the horizontal direction and convexly formed in a downward of the case 110. In this case, when the magnetic member 120 is attached to the outer surface of the cooking vessel 10, the central portion 133*b* of the heat conductive member 133 may be in close contact with the outer surface of the cooking vessel 10 in the horizontal direction.

More specifically, referring to FIG. 5*a*, in the second structural example, the first and second temperature sensors 130*a* and 130*b* may be in contact with the heat conductive member 133 inside the case 110. For example, the temperature sensor 130 may be disposed on both ends 133*a* of the heat conductive member 133 inside the case 110 to be in contact with the heat conductive member 133.

Both ends 133*a* of the heat conductive member 133 may be fixed to the inside of the case 110, and the central portion 133*b* of the heat conductive member 133 may be disposed between both ends 133*a* of the heat conductive member 133 in the horizontal direction, and be convexly formed in the downward direction of the case 110 to be exposed to the outside of the case 110.

The central portion 133*b* of the heat conductive member 133 may be deformed along the outer surface of the cooking vessel 10 as it has elasticity, and may be in close contact with each measurement point with a wide contact area. The heat conductive member 133 vertically spaced a predetermined distance apart from each other may be in close contact with each measurement point to transfer the heat generated at the measurement point to the first and second temperature sensors 130*a* and 130*b*, and the first and second temperature sensors 130*a* and 130*b* may measure the temperature of each measurement point using the heat transferred through the heat conductive member 133.

On the other hand, when the heat conductive member 133 and the magnetic member 120 protrude from the bottom surface of the case 110 as shown in FIG. 5*a*, the protruding height of the central portion 133*b* at the time no deformation is applied to the heat conductive member 133 may be greater than the protruding height of the magnetic member 120. Also, the maximum elastic force of the central portion 133*b* may be weaker than the attractive force of the magnetic member 120. Accordingly, when the magnetic member 120 is attached to the outer surface of the cooking vessel 10, the central portion 133*b* may be in close contact with the outer surface of the cooking vessel 10 by applying a predetermined pressure to the outer surface of the cooking vessel 10.

Referring to FIG. 6, both ends 133a are fixed to the bottom surface of the case 110, and the heat conductive member 133 in which the central portion 133b thereof convexly protrudes in the downward direction of the case 110 may be in contact with the outer surface of the cooking vessel 10 and may be deformed along the outer surface of the cooking vessel 10 by elasticity.

As the central portion 133b of the heat conductive member 133 is deformed along the outer surface of the cooking vessel 10, the contact surface for the measurement point may be widened, and the heat transferred over a wide area may be provided to the temperature sensor 130. The temperature sensor 130 may measure the temperature of heat transferred from a wide contact surface, and accordingly, the accuracy of temperature measurement may be improved.

Hereinafter, a process of estimating the temperature of food in the cooking vessel 10 based on the temperatures of the two measurement points measured through the structure described above will be described in detail. In addition, in the following description, it is assumed that the two measurement points on the outer surface of the cooking vessel 10 are any two points lower than the height of the food in the cooking vessel 10.

Referring back to FIGS. 3a and 3b, the controller 140 may be provided inside the case 110. The controller 140 may control the overall operation of the apparatus 100 for estimating a temperature of food being cooked. More specifically, the controller 140 may control various apparatuss included in the apparatus 100 for estimating a temperature of food being cooked, such as the communication module 150, the display module 160, a gyro sensor and the like to be described later.

The controller 140 may estimate the temperature of food being cooked based on the average value of the temperatures respectively measured by the first and second temperature sensors 130a and 130b and a desired temperature value provided by a user.

The desired temperature value is a value set by a user, and may be set as a user's desired temperature of the food. As described above, when the heating source is the induction heating apparatus 200, the user may input a desired temperature value through the interface provided by the induction heating apparatus 200, and the induction heating apparatus 200 may control the output of the heating coil 210 according to the desired temperature value. For example, when the induction heating apparatus 200 is as shown in FIG. 1, the user may input the desired temperature value through the knob switch 220, and the induction heating apparatus 200 may control the output of the heating coil 210 according to the degree of the rotation of the knob switch 220.

On the other hand, the apparatus 100 for estimating a temperature of food being cooked may further include the communication module that is provided in the case 110, receives the desired temperature value through wireless communication and provides the received desired temperature value to the controller 140.

More specifically, the communication module 150 in the apparatus 100 for estimating a temperature of food being cooked may perform wireless data communication with the communication unit of the induction heating apparatus 200. Through this, the communication module 150 may receive the desired temperature value input to the induction heating apparatus 200 by the user.

On the other hand, the cooking vessel 10 is configured to include any component exhibiting magnetic properties, the thermal conductivity of the cooking vessel 10 may be different depending on the material constituting the cooking vessel 10. For example, the thermal conductivity of the cooking vessel 10 made of pig iron may be higher than the thermal conductivity of the cooking vessel 10 made of cast iron. The cooking vessel 10 having relatively high thermal conductivity has a small temperature change according to height, whereas the cooking vessel 10 having relatively low thermal conductivity may have a large temperature change according to the height.

Accordingly, the temperature difference between the two measurement points spaced a predetermined distance apart from each other in the vertical direction may also increase or decrease according to the thermal conductivity. For example, the temperature difference between the two measurement points of the cooking vessel 10 made of pig iron may be smaller than the temperature difference between the two measurement points of the cooking vessel 10 made of cast iron.

In order to compensate for the temperature difference according to the height, the controller 140 may use the average value (hereinafter referred to as the average measurement value) of the temperatures respectively measured by the first and second temperature sensors 130a and 130b to estimate the temperature of the food being cooked.

On the other hand, when the food is heated, the cooking vessel 10 serves as a medium for transmitting the temperature of the food to the temperature sensor 130, so that there may be a fundamental difference between the actual temperature of the food and the average measurement value.

This temperature difference may increase as the desired temperature value increases. For example, when the actual temperature of the heated food according to the relatively low desired temperature value is 50 degrees, the average measurement value may be 47 degrees, and in this case, the difference between the actual temperature of the food and the average measurement value may be 3 degrees. On the other hand, when the actual temperature of the heated food according to the relatively high desired temperature value is 90 degrees, the average measurement value may be 84 degrees, and in this case, the difference between the actual temperature of the food and the average measurement value may be 6 degrees.

The controller 140 may identify the measurement offset of the cooking vessel 10 according to the desired temperature value in order to consider the fundamental difference between the average measurement value and the actual temperature of the food generated in the heat transfer process of the cooking vessel 10, and may estimate the temperature of the food in consideration of the identified measurement offset.

More specifically, the controller 140 may identify the measurement offset of the cooking vessel 10 with reference to an internal memory (not shown). The measurement offset is a parameter for considering the difference between the average measurement value and the actual temperature of the food, and may be proportional to the desired temperature value. The measurement offset may be determined experimentally and stored in advance in the internal memory.

When the measurement offset is identified, the controller 140 may estimate the temperature of the food by adding the measurement offset to the average measurement value.

That is, the controller 140 may estimate the temperature of the food being cooked according to the following [Equation 1].

$$Te = Ta + f1, \left(Ta = \frac{T1 + T2}{2}\right) \quad \text{[Equation 1]}$$

(Te is the estimated temperature of the food being cooked, f1 is the measurement offset of the cooking vessel 10, Td is the desired temperature value, T1 is the measurement value of the first temperature sensor 130a, T2 is the measurement value of the second temperature sensor 130b, Ta is the average measurement value)

As described above, the present disclosure can improve the accuracy of temperature estimation by correcting the difference between the actual temperature of the food being cooked and the measurement value, which is generated as the user's desired temperature increases, and estimating the temperature of the food.

On the other hand, when the food is heated, the temperature of the outer surface of the cooking vessel 10 may track the desired temperature value. However, as the desired temperature value increases, the degree to which the temperature of the outer surface of the cooking vessel 10 tracks the desired temperature value may decrease. More specifically, the temperature of the cooking vessel 10 may not track the desired temperature value in a situation in which the desired temperature value is high and the food is rapidly heated, rather than in a situation in which the desired temperature value is low and the food is slowly heated.

For example, when the desired temperature value is 40 degrees, the average measurement value may be 36 degrees, and in this case, the difference between the average measurement value and the desired temperature value may be 4 degrees. On the other hand, when the desired temperature value is 90 degrees, the average measurement value may be 82 degrees, and in this case, the difference between the average measurement value and the desired temperature value may be 8 degrees.

The controller 140 may identify the temperature tracking offset of the cooking vessel 10 according to the desired temperature value in order to consider the difference between the average measurement value and the desired temperature value generated during the heating process of the food, and estimate the temperature of the food by reflecting the identified temperature tracking offset in the error rate of the average measurement value with respect to the desired temperature value.

More specifically, the controller 140 may identify the temperature tracking offset of the cooking vessel 10 with reference to the internal memory. The temperature tracking offset is a parameter for considering the difference between the average measurement value and the desired temperature value, and may be proportional to the desired temperature value. The temperature tracking offset may be determined experimentally and stored in advance in the internal memory.

When the temperature tracking offset is identified, the controller 140 may estimate the temperature of the food by adding the product of the error rate of the average measurement value with respect to the desired temperature value and the temperature tracking offset to the average measurement value.

That is, the controller 140 may estimate the temperature of the food being cooked according to the following [Equation 2].

$$Te = Ta + f2 \times \frac{(Td - Ta)}{Td}, \left(Ta = \frac{T1 + T2}{2}\right) \quad \text{[Equation 2]}$$

(Te is the estimated temperature of the food being cooked, f2 is the temperature tracking offset of the cooking vessel 10, Td is the desired temperature value, T1 is the measurement value of the first temperature sensor 130a, T2 is the measurement value of the second temperature sensor 130b, Ta is the average measurement value)

As described above, the present disclosure can improve the accuracy of temperature estimation by correcting the difference between the desired temperature and the measurement value, which occurs as the user's desired temperature increases, and estimating the temperature of the food.

On the other hand, the controller 140 may track the temperature of the food by considering both the fundamental difference between the actual temperature of the food and the average measurement value, as described above and the temperature difference that occurs when the temperature of the outer surface of the cooking vessel 10 tracks the desired temperature value.

That is, the controller 140 may estimate the temperature of the food being cooked according to the following [Equation 3], which is a synthesis of [Equation 1] and [Equation 2].

$$Te = Ta + f1 + f2 \times \frac{(Td - Ta)}{Td}, \left(Ta = \frac{T1 + T2}{2}\right) \quad \text{[Equation 3]}$$

(Te is the estimated temperature of the food being cooked, f1 is the measurement offset of the cooking vessel 10, f2 is the temperature tracking offset of the cooking vessel 10, Td is the desired temperature value, T1 is the measurement value of the first temperature sensor 130a, T2 is the measurement value of the second temperature sensor 130b, Ta is the average measurement value)

However, in putting [Equation 1] and [Equation 2] together, the measurement offset of the cooking vessel 10 that is applied to [Equation 3] may be different from the measurement offset of the cooking vessel 10 that is applied to [Equation 1], and the temperature tracking offset of the cooking vessel 10 that is applied to [Equation 3] may be different from the temperature tracking offset of the cooking vessel 10 that is applied to [Equation 2]. The measurement offset and the temperature tracking offset of the cooking vessel 10 that are applied to [Equation 3] may also be determined experimentally as parameters proportional to the desired temperature value, respectively.

As described above, the present disclosure estimates the temperature of the food contained in the cooking vessel by using the temperatures of two arbitrary measurement points located at the outer surface of the cooking vessel and spaced a predetermined distance apart from each other in the vertical direction, thereby compensating for the temperature difference according to the height of the measurement point caused by the difference in thermal conductivity for each cooking vessel so that it is possible to perform an operation of estimating the temperature of the food contained in any cooking vessel.

In addition, the present disclosure can increase the accuracy of temperature estimation by estimating the temperature of the food in consideration of the fundamental difference between the actual temperature of the food and the measurement value and the difference between the temperature of the food desired by the user and the measurement value.

Meanwhile, the controller 140 may compare the average measurement value and the desired temperature value, and if the average measurement value is equal to or greater than a preset ratio of the desired temperature value, the above-described temperature estimation operation of the food being cooked may be performed.

When a desired temperature value is input to the induction heating apparatus 200 and the food being cooked starts to be heated, the temperature of the food may track the desired temperature value over time. However, the above-described measurement offset and temperature tracking offset of the cooking vessel 10 may be parameters determined by an experiment in a state in which heating of the food is completed (equilibrium state).

Accordingly, when the temperature of the food is estimated by applying the measurement offset and the temperature tracking offset of the cooking vessel 10 at the time the temperature of the food rises, the accuracy of temperature estimation may be reduced.

To prevent this, when the average measurement value is equal to or greater than a preset ratio of the desired temperature value, for example, 90% or more, the controller 140 may determine that the heating of the food has been completed and perform the above-described temperature estimation operation of the food.

Referring back to FIGS. 2, 3a, and 3b, the apparatus 100 for estimating a temperature of food being cooked may include a display module 160. The display module 160 may be provided in the case 110, and one surface of the display module 160 may be exposed on the upper surface of the case 110.

By controlling the display module 160, the controller 140 may visually output the estimated temperature of the food according to the above-described method through the display module 160.

An output operation of the display module 160 may be performed according to a user manipulation of the function button 190b illustrated in FIG. 2. In other words, only when the user manipulates the function button 190b, the display module 160 may output the estimated temperature of the food.

Meanwhile, although not shown in the drawings, the apparatus 100 for estimating a temperature of food being cooked may further include a gyro sensor provided in the case 110 to detect whether the case 110 is vertically disposed. In other words, the apparatus 100 for estimating a temperature of food being cooked of the present disclosure may include the gyro sensor therein to ensure the vertical arrangement of the first and second temperature sensors 130a and 130b.

The gyro sensor may detect whether the case 110 is vertically disposed by measuring a left and right rotation angle (roll) of the case 110 with respect to the vertical direction. More specifically, the gyro sensor can detect the case 110 as in a normal arrangement state when the left and right rotation angle of the case 110 is within 5° with respect to the vertical direction, and when it exceeds 5°, the gyro sensor can detect the case 110 as in a misplaced state.

The detection operation of the gyro sensor may be performed according to the user manipulation of the function button 190b illustrated in FIG. 2. In other words, only when the user manipulates the function button 190b, the gyro sensor may detect whether the case 110 is vertically disposed.

The gyro sensor may provide a signal according to the detection state to the controller 140, and the controller 140 may output the detection result of the gyro sensor through the display module 160. For example, the controller 140 may control the display module 160 to display text, color, symbol and the like indicating that the current arrangement state is normal or abnormal according to the detection result of the gyro sensor.

On the other hand, as shown in FIGS. 3a and 3b, the apparatus 100 for estimating a temperature of food being cooked may further include the battery 170, the above-described controller 140, communication module 150, display module (160) and gyro sensor may operate by receiving power from the battery 170.

The power supply operation of the battery 170 may be performed according to the user manipulation of the power button 190a illustrated in FIG. 2. In other words, only when the user manipulates the power button 190a, the battery 170 may perform the power supply operation.

For those of ordinary skill in the art to which the present disclosure pertains, various substitutions, modifications and changes of the present disclosure described above may be possible without departing from the present disclosure, so the present disclosure is not limited by the above-described embodiments and the accompanying drawings.

What is claimed is:

1. An apparatus, which is attached to an outer surface of a cooking vessel containing food in a vertical direction, for estimating a temperature of the food, comprising:
   a case;
   a magnetic member which is provided at a bottom surface of the case and attaches the case to the outer surface of the cooking vessel by forming an attractive force with respect to the outer surface of the cooking vessel;
   first and second temperature sensors which are disposed at the bottom surface of the case while being spaced a predetermined distance apart from each other in the vertical direction, and measure temperatures of two measurement points located at the outer surface of the cooking vessel and spaced the predetermined distance apart from each other in the vertical direction, respectively; and
   a controller which is provided in the case and estimates the temperature of the food based on an average value of the temperatures measured respectively by the first and second temperature sensors and a desired temperature value provided by a user,
   wherein the controller compares the average value and the desired temperature value, and estimates the temperature of the food when the average value is equal to or greater than a preset ratio of the desired temperature value.

2. The apparatus according to claim 1, wherein the magnetic member includes first and second magnetic members which stand and are spaced apart from each other in the vertical direction and protrude in a downward direction of the case.

3. The apparatus according to claim 2, wherein the case includes a receiving space which protrudes in the downward direction to accommodate the first and second magnetic members.

4. The apparatus according to claim 1, wherein the first and second temperature sensors are connected to the other end of a spring having one end fixed to the bottom surface of the case and protruding in a downward direction of the case, and are in close contact with the outer surface of the cooking vessel by elastic force of the spring to measure the temperatures of the two measurement points, respectively.

5. The apparatus according to claim 4, wherein a heat conductive member made of a material having elasticity is provided on bottom surfaces of the first and second temperature sensors, and the first and second temperature sensors measure the temperatures of the two measurement points transmitted through the heat conductive member.

6. The apparatus according to claim 1, wherein the first and second temperature sensors are made of a material having elasticity, and respectively measure the temperatures of the two measurement points transmitted through a heat conductive member in close contact with the outer surface of the cooking vessel.

7. The apparatus according to claim 6, wherein the heat conductive member respectively connected to the first and second temperature sensors includes first and second ends fixed to an inside of the case, and a central portion connected to the first and second ends in a horizontal direction and convexly formed in a downward direction of the case, and the central portion is in close contact with the outer surface of the cooking vessel along the horizontal direction.

8. The apparatus according to claim 1, further comprising a communication module which is provided in the case, receives the desired temperature value through wireless communication, and provides the received desired temperature value to the controller.

9. The apparatus according to claim 1, wherein the controller identifies a measurement offset of the cooking vessel according to the desired temperature value, and estimates the temperature of the food in consideration of the identified measurement offset.

10. The apparatus according to claim 9, wherein the measurement offset of the cooking vessel is proportional to the desired temperature value.

11. The apparatus according to claim 1, wherein the controller identifies a temperature tracking offset of the cooking vessel according to the desired temperature value, and estimates the temperature of the food by reflecting the identified temperature tracking offset in an error rate of the average value with respect to the desired temperature value.

12. The apparatus according to claim 11, wherein the temperature tracking offset of the cooking vessel is proportional to the desired temperature value.

13. The apparatus according to claim 1, wherein the controller estimates the temperature of the food according to a following equation:

$$Te = Ta + f1 + f2 \times \frac{(Td - Ta)}{Td}, \left(Ta = \frac{T1 + T2}{2}\right)$$

(Te is the estimated temperature of the food, f1 is a measurement offset of the cooking vessel, f2 is a temperature tracking offset of the cooking vessel, Td is the desired temperature value, T1 is the measurement value of the first temperature sensor, T2 is the measurement value of the second temperature sensor, Ta is the average value).

14. The apparatus according to claim 1, further comprising a display module which is provided in the case and has one surface exposed to an upper surface of the case,
wherein the controller outputs the estimated temperature of the food through the display module.

15. The apparatus according to claim 14, further comprising a gyro sensor which is provided in the case to detect whether the case is vertically disposed,
wherein the controller outputs a detection result of the gyro sensor through the display module.

16. An apparatus, which is attached to an outer surface of a cooking vessel containing food in a vertical direction, for estimating a temperature of the food, comprising:
a case;
a magnetic member which is provided at a bottom surface of the case and attaches the case to the outer surface of the cooking vessel by forming an attractive force with respect to the outer surface of the cooking vessel;
first and second temperature sensors which are disposed at the bottom surface of the case while being spaced a predetermined distance apart from each other in the vertical direction, and measure temperatures of two measurement points located at the outer surface of the cooking vessel and spaced the predetermined distance apart from each other in the vertical direction, respectively; and
a controller which is provided in the case and estimates the temperature of the food based on an average value of the temperatures measured respectively by the first and second temperature sensors and a desired temperature value provided by a user,
wherein the controller estimates the temperature of the food according to a following equation:

$$Te = Ta + f1 + f2 \times \frac{(Td - Ta)}{Td}, \left(Ta = \frac{T1 + T2}{2}\right),$$

where Te is the estimated temperature of the food, f1 is a measurement offset of the cooking vessel, f2 is a temperature tracking offset of the cooking vessel, Td is the desired temperature value, T1 is the measurement value of the first temperature sensor, T2 is the measurement value of the second temperature sensor, and Ta is the average value.

* * * * *